United States Patent
Kondo

Patent Number: 5,179,465
Date of Patent: Jan. 12, 1993

[54] OPTICAL SYSTEM FOR LIGHT BEAM SCANNING

[75] Inventor: Kazuyuki Kondo, Kawasaki, Japan

[73] Assignee: Canon Kabushiki Kaisha, Tokyo, Japan

[21] Appl. No.: 913,982

[22] Filed: Jul. 16, 1992

Related U.S. Application Data

[63] Continuation of Ser. No. 651,288, Jan. 13, 1991, abandoned.

[30] Foreign Application Priority Data

Feb. 7, 1990 [JP] Japan .................................. 2-27381

[51] Int. Cl.$^5$ ...................... G02B 26/08; G02B 26/10
[52] U.S. Cl. .................................. 359/218; 359/206; 359/216; 359/711
[58] Field of Search ................. 359/206, 216, 218, 711

[56] References Cited

U.S. PATENT DOCUMENTS

| | | | |
|---|---|---|---|
| 4,277,128 | 7/1981 | Kawamura | 350/6.8 |
| 4,379,612 | 4/1983 | Matsuoka et al. | 359/218 |
| 4,443,055 | 4/1984 | Matsuoka et al. | 359/218 |
| 4,447,112 | 5/1984 | Matsuoka et al. | 359/218 |
| 4,639,072 | 1/1987 | Itoh et al. | 359/218 |
| 4,674,825 | 6/1987 | Tateoka et al. | 359/218 |
| 4,707,085 | 11/1987 | Takanashi et al. | 350/61 X |
| 4,836,630 | 6/1989 | Takanashi | 350/6.1 |
| 4,866,459 | 9/1989 | Tokita et al. | 359/218 |

FOREIGN PATENT DOCUMENTS

| | | |
|---|---|---|
| 0121033 | 10/1984 | European Pat. Off. . |
| 3207468 | 9/1982 | Fed. Rep. of Germany . |
| 3238665 | 5/1983 | Fed. Rep. of Germany . |
| 62-265615 | 11/1987 | Japan . |

Primary Examiner—Scott J. Sugarman
Attorney, Agent, or Firm—Fitzpatrick, Cella, Harper & Scinto

[57] ABSTRACT

A scanning optical system used for light beam scanning device is disclosed. The scanning optical system is disposed between a deflector for deflecting a light beam and a plane to be scanned. In the scanning optical system, a spherical lens having a positive power and a toric lens are arrnaged. The toric lens is positioned close to the spherical lens at the side thereof closer to the plane to be scanned. The toric lens has positive powers both in the main and sub scanning cross sectional planes. At least one of the faces of the toric lens is aspherical in the main scanning cross sectional plane.

44 Claims, 3 Drawing Sheets

OPTICAL SYSTEM FOR LIGHT BEAM SCANNING

This application is continuation of application Ser. No. 07/651,288 filed Jan. 31, 1991 now abandoned.

BACKGROUND OF THE INVENTION

1. Field of the Invention

The present invention relates to an optical system for light beam scanning, adapted for use in a laser beam printer, a digital copying machine or the like.

2. Related Background Art

Conventional optical systems for such light beam scanning generally utilize light beam deflection by a rotary polygon mirror, as disclosed in the U.S. Pat. No. 4,379,612. If the reflecting faces of such polygon mirror involve an angular error (face inclination) with respect to the rotary axis, the light beam in scanning motion is displaced to undesirably influence the final image output. In order to avoid such undesirable influence of the face inclination, there is already proposed, as described in the above-mentioned patent, to place the rotary polygon mirror and the scanned plane (irradiated plane) in a optically conjugate relationship by means of a toric lens. It is also proposed, as described in the U.S. Pat. No. 4,639,072, to alleviate the influence of the face inclination by positioning a cylindrical lens in the vicinity of the plane scanned by the light beam.

However, in the above-mentioned structure employing a toric lens, in order to correct the aberrations for maintaining desired optical performance, the toric lens has to be close to a plano-convex lens in the shape in the main scanning cross-sectional plane, and a spherical concave lens positioned between the toric lens and the rotary polygon mirror has to be close to a plano-concave or biconcave shape, so that the image angle is inevitably limited. Stated differently, a wider image angle with same optical performance will inevitably require thicker lenses, and as a result, the apparatus will become large.

Also it is generally difficult to manufacture the toric lens, and the use of the toric lens, is a factor of increased cost.

In order to avoid such drawbacks, there can be conceived to prepare the toric lens with a plastic material, but, since said toric lens represents a significant portion in the power of the entire conventional optical system consisting of a concave spherical lens and a convex toric lens from the side of the rotary polygon mirror, the power fluctuation in the plastic lens resulting from changes in ambient conditions is not negligible and results for example in a defocus on the scanned plane.

On the other hand, the other conventional structure utilizing the cylindrical lens in the vicinity of the scanned plane is less affected by the ambient conditions, but the presence of such optical component as the cylindrical lens close to a photosensitive drum is undesirable, for example in an electrophotographic laser beam printer, because various process components such as the developing unit and the cleaning station are positioned close to the photosensitive drum. Also such cylindrical lens, if positioned close to the photosensitive drum, is apt to be subjected to undesirable influence by stain with toner, heat, ozone etc.

SUMMARY OF THE INVENTION

In consideration of the foregoing, the object of the present invention is to provide an optical system for light beam scanning, excellent in performance, widening of image angle, compactization, resistance to fluctuation in ambient conditions, and cost.

The above-mentioned object can be attained, according to the present invention, by a scanning optical system, for use in a light beam scanning device for deflecting a light beam by deflection means (for example a rotary polygon mirror) thereby scanning a plane (for example a photosensitive drum) and to be positioned between said deflection means and said scanned plane, said optical system being composed of a spherical lens with a positive power and a toric lens positioned close to a face of said spherical lens, facing said scanned plane, and having positive powers both in the main and sub scanning cross sections, wherein at least a face of said toric lens in the main scanning cross section is aspherical.

More specifically, said spherical lens is approximately planar in a face thereof closer to the deflection means, and is convex in the other face closer to the scanned plane. The toric lens has a concentric shape, having the center of radius of curvature at a side closer to the deflection means. In addition said toric lens is so designed to satisfy at least one of following relations:

$0.1 < f_a/f_{2a} < 0.3$
$0.25 < f_{2b}/f_a < 0.5$
$0.6 < l/f_a < 1$
$0 < d_{max}/f_{2b} < 0.15$ wherein $f_{2a}$ is the focal length of the toric lens in the main scanning cross section; $f_{2b}$ is the focal length of the toric lens in the sub scanning cross section; $f_a$ is the synthesized focal length of the spherical lens and the toric lens in the main scanning cross section; $l$ is the distance between the toric and the scanned plane; and $d_{max}$ is the maximum thickness of the toric lens in the optical axis.

The toric lens may be composed for example of a plastic material, and, among the four conditions mentioned above, the latter two are important in forming the toric lens with a plastic material.

DESCRIPTION OF THE PREFERRED EMBODIMENTS

Now the present invention will be clarified in detail by preferred embodiments thereof shown in the attached drawings.

Figure 1:
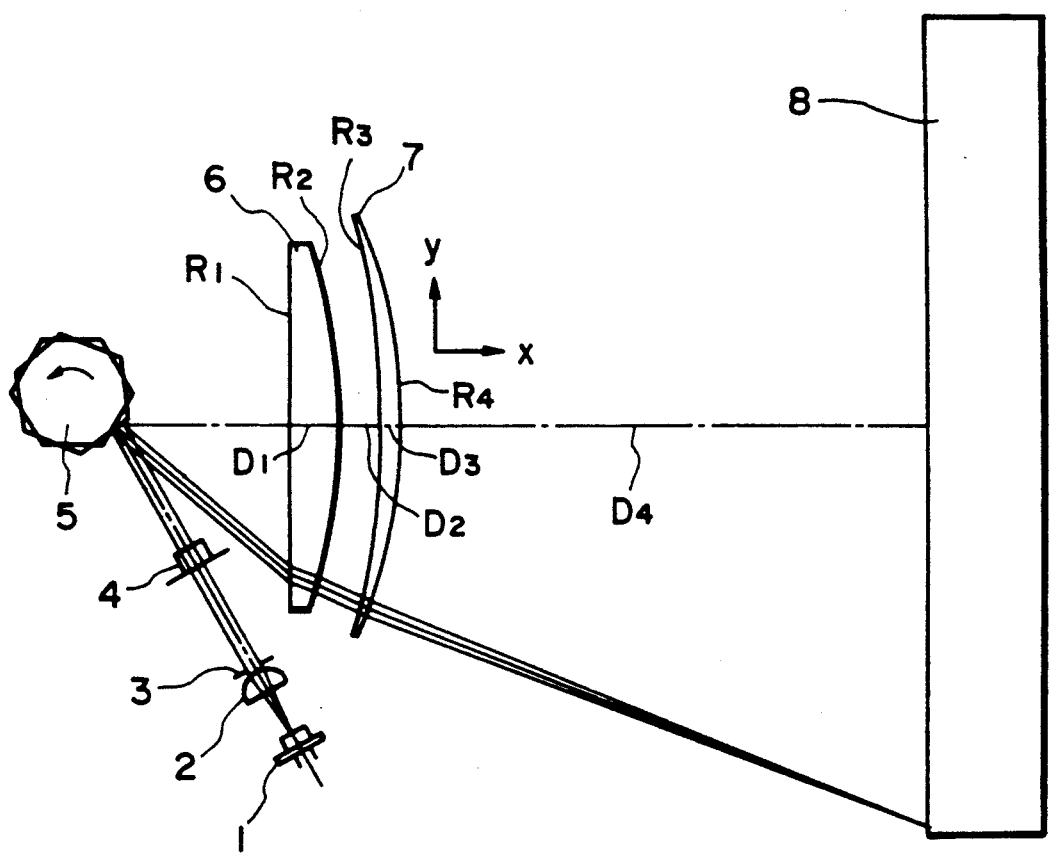
FIG. 1 is a view of a first embodiment of the present invention in the main scanning plane thereof.
Figure 2:
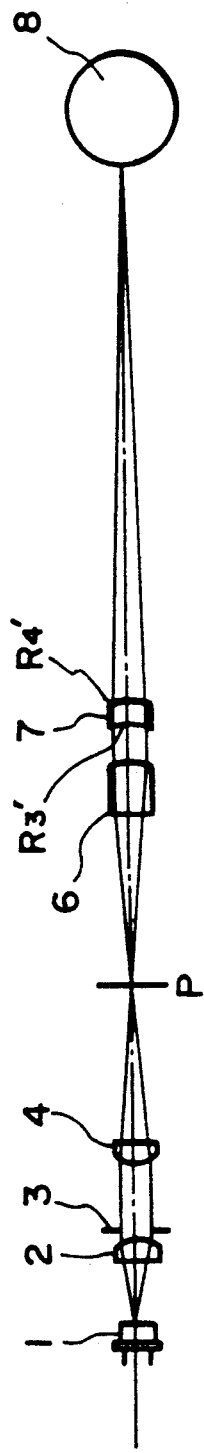
FIG. 2 is a view of the first embodiment of the present invention in the sub scanning plane thereof.

FIGS. 1 and 2 illustrate a first embodiment of the present invention, respectively in the main scanning cross-sectional plane and in the sub scanning cross-sectional plane including the optical axis and perpendicular to the main scanning plane.

Referring to FIG. 1, a light beam emitted by a semiconductor laser 1 is converted into a substantially parallel beam by a collimating lens 2, then is shaped in the size of cross-section by a diaphragm aperture 3 and enters a cylindrical lens 4. As said cylindrical lens 4 has a power in the sub scanning cross section but is powerless in the main scanning cross section, the light beam enters a rotary polygon mirror 5 maintaining the parallel beam state in the main scanning cross section but being focused in a line in the sub scanning cross section. The rotary polygon mirror 5 is rotated at a constant high speed in a direction indicated by an arrow, so that the incident light beam is deflected by reflection by said mirror and put into a scanning motion in the main scanning plane.

The light beam deflected with a constant angular velocity passes through a spherical lens 6 of a positive power and a toric lens 7 having positive powers both in the main and sub scanning cross sections, and is focused on a photosensitive drum 8, achieving a linear scanning motion with a substantially constant speed.

Referring to FIG. 2, P indicates the position of reflecting face of the rotary polygon mirror 5, and, in the sub scanning cross section, the light beam substantially converges on this point P as explained above. Since the reflecting face P and the photosensitive drum 8 are optically substantially conjugate, the light beam can be focused on the same scanning line on the photosensitive drum 8 even if the reflecting face P involves an angular error (face inclination) in the sub scanning cross sectional plane. Thus provided is a compensating system for the face inclination of the rotary polygon mirror 5.

In the above-explained structure, the scanning lenses 6, 7 are constructed in the following manner, for realizing satisfactory image plane curvature and f-$\theta$ characteristics over a wide image angle in the main scanning plane.

At first, in the spherical lens 6 of positive power, the face positioned closer to the rotary polygon mirror 5 is formed almost planar, in order to generate a negative distortion for realizing satisfactory f-$\theta$ characteristics. The face positioned closer to the photosensitive drum is formed convex thereto, in order to satisfactorily correct the image plane curvature.

The toric lens 7 is positioned behind and close to the spherical lens 6, and has a concentric shape (centers of radii of curvature of both faces of said toric lens 7 being positioned at the side of the rotary polygon mirror and mutually close) in which at least one of the faces is aspherical in the main scanning cross sectional plane, in order to correct the curvature of image plane over a wide image angle. Besides, since well-balanced corrections of the f-$\theta$ characteristics and the image plane curvature in the scanning direction or in the meridional direction become difficult in case of an excessive power of the toric lens 7 in the main-scanning cross sectional plane, said power is preferably so reduced as to satisfy a condition $0.1 < f_a/f_{2a} < 0.3$, wherein $f_{2a}$ is the focal length of the toric lens in the main scanning cross sectional plane while $f_a$ is the synthesized focal length of the spherical lens 6 and the toric lens 7 in said plane.

More specifically, if below the lower limit (i.e. $f_{2a} > 10 f_a$), the correction of aberrations is made easier but the toric lens 7 is positioned closer to the scanned plane (photosensitive drum 8) and becomes inevitably large. On the other hand, if above the upper limit (i.e. $f_{2a} < 3.333 \ldots \times f_a$), a smaller value of $f_{2a}$ is favorable for compactization of the apparatus but renders it difficult to correct the f-$\theta$ characteristics and the image plane curvature in well balanced manner.

On the other hand, the focal length $f_{2b}$ of the toric lens 7 in the sub scanning cross sectional plane is preferably so selected as to satisfy a condition $0.25 < f_{2b}/f_a < 0.5$ in order to satisfactorily correct the image plane curvature in the sagittal direction (perpendicular direction to the optical axis in the sub scanning cross sectional plane).

Above the upper limit of said condition (i.e. $f_{2b} > 0.5 f_a$), $f_{2b}$ becomes larger, thus facilitating the correction of aberrations but the toric lens 7 is undesirably positioned closer to the scanned plane (photosensitive drum 8) as in the aforementioned conventional structure. Also below the lower limit (i.e. $f_{2b} < 0.25 f_a$), $f_{2b}$ becomes smaller, rendering it difficult to achieve balanced corrections of the image plane curvature in the meridional and sagittal directions.

Furthermore, the toric lens 7 is preferably so positioned as to satisfy a relation $0.6 < 1/f_a < 1$ wherein 1 is the distance between the toric lens 7 and the scanned plane. Below the lower limit (i.e. $1 < 0.6 f_a$), the apparatus becomes bulky and the effect for compensating the face inclination becomes limited. On the other hand, above the upper limit (i.e. $1 > f_a$), the toric lens 7 will have a stronger power, and there will result an untolerable defocus on the scanned plane, for example due to changes in the ambient conditions, particularly when the toric lens 7 is formed by a plastic material in consideration of the cost.

Furthermore, the toric lens 7 is preferably formed so thin as to satisfy a condition $0 < d_{max}/f_{2b} < 0.15$, wherein $d_{max}$ is the maximum axial thickness of the toric lens. This condition reduces the defocus on the scanned plane, resulting from changes in ambient conditions, particularly moisture absorption of the toric lens 7, and facilitates the molding thereof with a plastic material.

As explained in the foregoing, the use of a thin toric lens of a relatively weak power, including an aspherical face, allows to obtain an inexpensive scanning optical system showing satisfactory performance over a wide image angle and little affected by changes in the ambient conditions even when the toric lens is molded with a plastic material.

Figure 3:
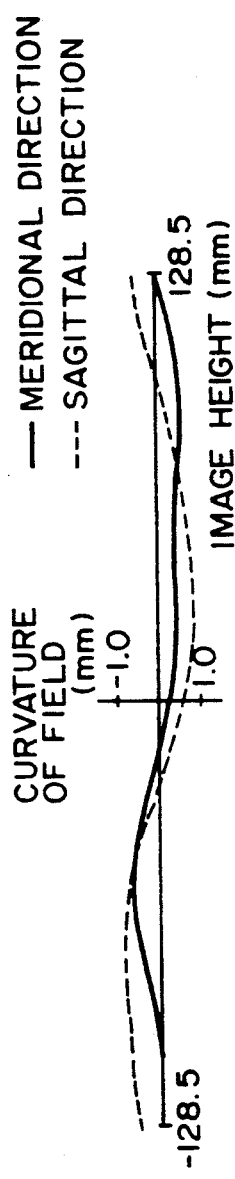
FIG. 3 is an aberration chart of the image plane curvature of the first embodiment.
Figure 4:
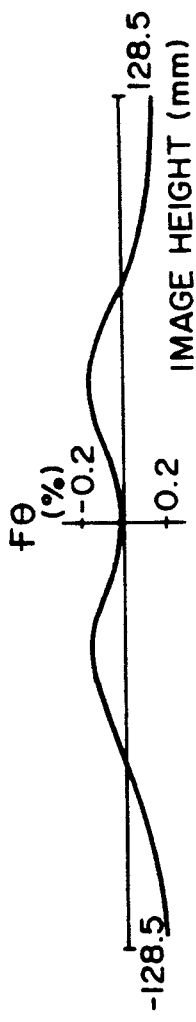
FIG. 4 is an aberration chart showing the f-$\theta$ characteristics of the first embodiment.

FIGS. 3 and 4 show the image plane curvature and the f-$\theta$ characteristics of the first embodiment, in which the spherical lens with positive power is composed of glass while the toric lens of positive power is composed of a plastic material.

In the following there is given a specific numerical example of the first embodiment:

| Focal length of entire system | 184 mm |
|---|---|
| Maximum scanning angle | 80° |
| Deflection point - $R_1$ plane | 54.6 mm |
| $R_1 = \infty$ | $D_1 = 16.7$ |
| | $N_1 = 1.78569$ |
| $R_2 = -181.29$ | $D_2 = 12.1$ |
| $R_3 = -575.78$ | $D_3 = 6.8$ |
| | $N_3 = 1.51920$ |
| $B = -4.06691 \times 10^{-7}$ | |
| $C = 4.54821 \times 10^{-11}$ | |
| $D = -9.52776 \times 10^{-16}$ | |
| $R_3' = -22.26$ | |
| $R_4 = -247.28$ | $D_4 = 170.8$ |
| $B = -3.45955 \times 10^{-7}$ | |
| $C = 3.00766 \times 10^{-11}$ | |
| $D = 5.63771 \times 10^{-16}$ | |
| $R_4' = -15.10$ | | wherein $R_1$-$R_4$ are radii of curvature of the lens faces in the main scanning cross sectional plane, in the order from the side of rotary polygon mirror 5 as shown in FIGS. 1 and 2; $R_3'$ and $R_4'$ are radii of curvature in the sub scanning cross sectional plane; $D_1$-$D_4$ are distances between lens faces; $N_1$ and $N_2$ are refractive indexes at 780 nm of the lenses in the order from the side of the rotary polygon mirror 5; and B–D are aspherical coefficients in the following relation between the height y and distance x of the lens face on the x-y plane:

$$x = y^2/R[1+\{1-(y/R)^2\}^{\frac{1}{2}}] + By^4 + Cy^6 + Dy^8 \ldots$$

Figure 5:
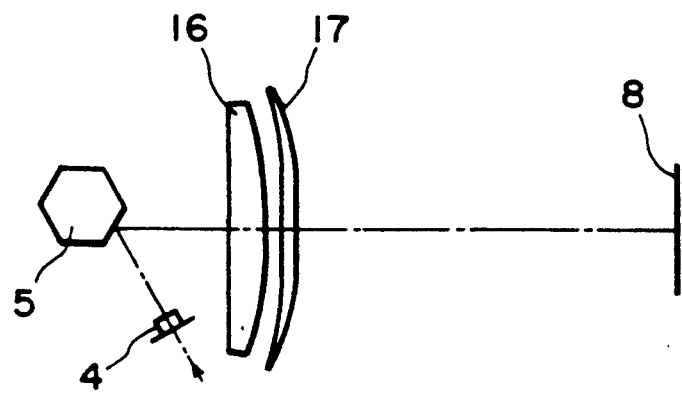
FIG. 5 is a view of a second embodiment.

FIG. 5 shows a second embodiment of the scanning optical system in the main scanning cross sectional plane, of which numerical example is given in the following. The spherical lens of positive power is composed of glass, while the toric lens of positive power is composed of a plastic material.

The aspherical face of the toric lens 17, positioned closer to the spherical lens 16, is formed almost planar in portion close to the optical axis. The symbols are defined same as in the foregoing numerical example.

| Focal length of entire system | 184 mm |
|---|---|
| Maximum scanning angle | 80° |
| Deflection point - $R_1$ plane | 51 mm |
| $R_1 = \infty$ | $D_1 = 17.7$ |
| | $N_1 = 1.78569$ |
| $R_2 = -193.95$ | $D_2 = 8.0$ |
| $R_3 = -1479.75$ | $D_3 = 6.9$ |
| | $N_3 = 1.51920$ |
| $B = -4.35513 \times 10^{-7}$ | |
| $C = 2.88834 \times 10^{-11}$ | |
| $D = -1.51643 \times 10^{-15}$ | |
| $R_3' = -23.00$ | |
| $R_4 = -286.29$ | $D_4 = 174.4$ |
| $B = -3.59684 \times 10^{-7}$ | |
| $C = 1.25611 \times 10^{-11}$ | |
| $D = -6.52037 \times 10^{-16}$ | |
| $R_4' = -14.95$ | |

Figure 6:
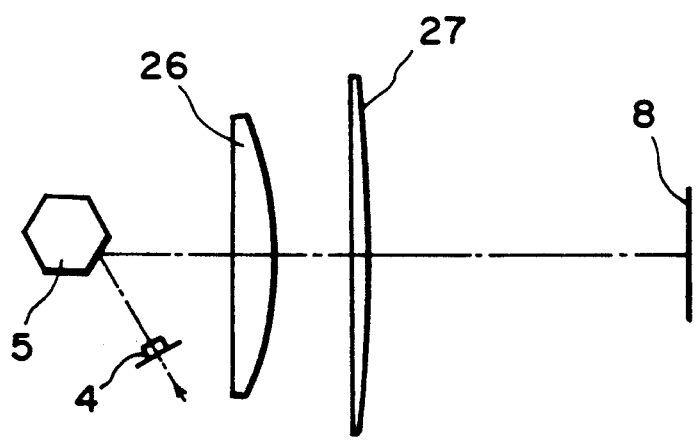
FIG. 6 is a view of a third embodiment.

FIG. 6 shows a third embodiment of the scanning optical system in the main scanning cross sectional plane, of which numerical example is given in the following. The spherical lens of positive power is composed of glass, while the toric lens of positive power is composed of a plastic material. In said third embodiment, the toric lens 27 is aspherical only in one face (positioned closer to the spherical lens 26) thereof.

| Focal length of entire system | 184 mm |
|---|---|
| Maximum scanning angle | 80° |
| Deflection point - $R_1$ plane | 60.1 mm |
| $R_1 = \infty$ | $D_1 = 20.1$ |
| | $N_1 = 1.78569$ |
| $R_2 = -160.70$ | $D_2 = 35.1$ |
| $R_3 = 3576.64$ | $D_3 = 7.8$ |
| | $N_3 = 1.48595$ |
| $B = -2.48657 \times 10^{-7}$ | |
| $C = 3.10118 \times 10^{-13}$ | |
| $D = 0$ | |
| $R_3' = -18.96$ | |
| $R_4 = -900.03$ | $D_4 = 146.6$ |
| $B = 0$ | |
| $C = 0$ | |
| $D = 0$ | |
| $R_4' = -14.11$ | | system, for use in a light beam scanning device for deflecting a light beam by deflection means thereby scanning a plane and to be positioned between said deflection means and said scanned plane, is constructed according to the present invention by a spherical lens of a positive power and a toric lens positioned close to said spherical lens at a side thereof closer to the scanned plane and having positive powers both in the main and sub scanning cross sectional planes, wherein at least a face of said toric lens is formed aspherical, thereby achieving high optical performance while compensating the eventual face inclination error in the rotary polygon mirror. Also the scanning optical system can be obtained inexpensively by forming the toric lens with a plastic material.

What is claimed is:

1. A scanning optical system, for use in a light beam scanning device for deflecting a light beam by deflection means thereby scanning a plane and to be positioned between said deflection means and said scanned plane, comprising:
   a spherical lens with a positive power; and
   a toric lens positioned close to said spherical lens at the side thereof closer to the scanned plane and having positive powers both in the main and sub scanning cross sectional planes, wherein at least one of the faces of said toric lens is aspherical in the main scanning cross sectional plane.

2. An optical system according to claim 1, wherein said spherical lens is approximately planar in a face thereof closer to the deflection means, and is convex to the scanned plane in a face thereof closer to said scanned plane.

3. An optical system according to claim 1, wherein said toric lens has a concentric shape with centers of radii of curvature at the side thereof close to the deflection means.

4. An optical system according to claim 1 further satisfying a relation:

$$0.1 < f_a/f_{2a} < 0.3$$

wherein $f_{2a}$ is the focal length of said toric lens in the main scanning cross sectional plane, and $f_a$ is the synthesized focal length of said spherical and toric lenses in said plane.

5. An optical system according to claim 1 further satisfying a relation:

$$0.25 < f_{2b}/f_a < 0.5$$

wherein $f_{2b}$ is the focal length of said toric lens in the sub scanning cross sectional plane, and $f_a$ is the synthesized focal length of said spherical and toric lenses in the main scanning cross sectional plane.

6. An optical system according to claim 1 further satisfying a relation:

$$0.6 < l/f_a < 1$$

wherein $f_a$ is the synthesized focal length of said spherical and toric lenses in the main scanning cross sectional plane, and l is the distance between said toric lens and said scanned plane.

7. An optical system according to claim 1 further satisfying a relation:

$$0 < d_{max}/f_{2b} < 0.15$$

wherein $f_{2b}$ is the focal length of said toric lens in the sub scanning cross sectional plane, and $d_{max}$ is the maximum thickness of said toric lens in a direction of the optical axis.

8. An optical system according to claim 1, wherein said toric lens is composed of a plastic material.

9. An optical system according to claim 1, wherein both faces of said toric lens are aspherical.

10. An optical system according to claim 1, wherein only the face of said toric lens facing the spherical lens is aspherical.

11. An optical system according to claim 1, wherein said spherical lens is made of a glass material and said toric lens is made of a plastic material.

12. A scanning optical system, for use in a light beam scanning device for deflecting a light beam by deflection means thereby scanning a plane and to be positioned between said deflection means and said scanned plane, comprising:
   a first lens of a positive power composed of glass; and
   a second lens of a positive power composed of a plastic material, positioned close to said first lens at a side thereof closer to said scanned plane.

13. An optical system according to claim 12, wherein the following condition is satisfied:

$$0.1 < f_a/f_{2a} < 0.3$$

where $f_{2a}$ is the focal length of said second lens in the main scanning cross section, and $f_a$ is the synthesized focal length of said first and second lenses in the main scanning cross section.

14. An optical system according to claim 12, wherein the following condition is satisfied:

$$0.25 < f_{2b}/f_a < 0.5$$

where $f_{2a}$ is the focal length of said second lens in the subs scanning cross section, and $f_a$ is the synthesized focal length of the first and second lenses in the main scanning cross section.

15. An optical system according to claim 12, wherein the following condition is satisfied:

$$0.6 < l/f_a < 1$$

where $f_a$ is the synthesized focal length of said first and second lenses in the main scanning cross section, and l is the distance between said second lens and said scanned plane.

16. An optical system according to claim 12, wherein the following condition is satisfied:

$$0 < d_{max}/f_{2b} < 0.15$$

where $f_{2D}$ is the focal length of said second lens in the sub scanning cross section, and $d_{max}$ is the maximum thickness of said second lens in a direction parallel to the optical axis.

17. A scanning optical system comprising:
   a light source unit;
   a light deflector for deflecting a light beam from said light source unit; and
   a scanning optical system for guiding the light beam deflected by said light deflector to a surface to be scanned, wherein said scanning optical system comprises a spherical lens having a positive power and a toric lens which is disposed close to said spherical lens at the side thereof closer to the surface to be scanned and which has positive powers in main and sub scanning cross sections, and wherein at least one of the faces of said toric lens is aspherical in the main scanning cross section.

18. An optical system according to claim 17 further satisfying a relation:

$$0.1 < f_a/f_{2a} < 0.3$$

wherein $f_{2a}$ is the focal length of said toric lens in the main scanning cross section, and $f_a$ is the synthesized focal length of said spherical and toric lenses in said main cross section.

19. An optical system according to claim 17 further satisfying a relation:

$$0.25 < f_{2b}/f_a < 0.5$$

wherein $f_{2b}$ is the focal length of said toric tens in the sub scanning cross section, and $f_a$ is the synthesized focal length of said spherical and toric lenses in the main scanning cross section.

20. An optical system according to claim 17 further satisfying a relation:

$$0.6 < l/f_a < 1$$

wherein $f_a$ is the synthesized focal length of said spherical and toric lenses in the main scanning cross section, and l is the distance between said toric lens and said scanned surface.

21. An optical system according to claim 17 further satisfying a relation:

$$0 < d_{max}/f_{2b} < 0.15$$

wherein $f_{2b}$ is the focal length of said toric lens in the sub scanning cross section, and $d_{max}$ is the maximum thickness of said toric lens in a direction of the optical axis.

22. An optical system according to claim 17, wherein both faces of said toric lenses are aspherical.

23. An optical system according to claim 17, wherein only the face of said toric lens facing the spherical lens is aspherical.

24. An optical system according to claim 17, wherein said toric lens is made of a plastic material.

25. An optical system according to claim 71, wherein said spherical lens is made of a glass material and said toric lens si made of a plastic material.

26. A laser beam printer comprising:
   a light source unit;
   a light deflector for deflecting a light beam from said light source unit;
   a recording medium; and
   a scanning optical system for guiding the light beam deflected by light deflector to said recording medium, wherein said scanning optical system comprises a spherical lens having a positive power and a toric lens which is disposed close to said spherical lens at the side thereof closer to the recording medium and which has positive powers in main and sub scanning cross sections, and wherein at least one of the faces of said toric lens is aspherical in the main scanning cross section.

27. An optical system according to claim 26 further satisfying a relation:

$$0.1 < f_a/f_{2a} < 0.3$$

wherein $f_{2a}$ is the focal length of said toric lens in the main scanning cross section, and $f_a$ is the synthesized focal length of said spherical and toric lenses in said main cross section.

28. An optical system according to claim 26 further satisfying a relation:

$$0.25 < f_{2b}/f_{2a} < 0.5$$

wherein $f_{2b}$ is the focal length of said toric lens in the sub scanning cross section, and $f_a$ is the synthesized focal length of said spherical and toric lenses in the main scanning cross section.

29. An optical system according to claim 26 further satisfying a relation:

$$0.6 < l/f_a < 1$$

wherein $f_a$ is the synthesized focal length of said spherical and toric lenses in the main scanning cross section, and l is the distance between said toric lens and said recording medium.

30. An optical system according to claim 26 further satisfying a relation:

$$0 < d_{max}/f_{2b} < 0.15$$

wherein $f_{2b}$ is the focal length of said toric lens in the sub scanning cross section, and $d_{max}$ is the maximum thickness of said toric lens in a direction of the optical axis.

31. A laser beam printer according to claim 26, wherein both faces of said toric lens are aspherical.

32. A laser beam printer according to claim 26, wherein only the face of said toric lens facing the spherical lens is aspherical.

33. A laser beam printer according to claim 26, wherein said toric lens is made of a plastic material.

34. A laser beam printer according to claim 26, wherein said spherical lens is made of a glass material and said toric lens is made of a plastic material.

35. A scanning optical system comprising:
  a light source unit;
  a light deflector for deflecting a light beam from said light source unit; and
  scanning optical system for guiding the light beam deflected by said light deflector to a surface to be scanned, wherein said scanning optical system comprises a first lens which is made of a glass material and has a positive power, and a second lens which is made of a plastic material, is disposed close to said first lens at the side thereof closer to the surface to be scanned, and has a positive power.

36. An optical system according to claim 35, wherein the following condition is satisfied:

$$0.1 < f_a/f_{2a} < 0.3$$

where $f_{2a}$ is the focal length of said second lens in a main scanning cross section, and $f_a$ is the synthesized focal length of said first and second lenses in the main scanning cross section.

37. An optical system according to claim 35, wherein the following condition is satisfied:

$$0.25 < f_{2b}/f_a < 0.5$$

wherein $f_{2a}$ is the focal length of said second lens in a sub scanning cross section, and $f_a$ is the synthesized focal length of said first and second lenses in the main scanning cross section.

38. An optical system according to claim 35, wherein the following condition is satisfied:

$$0.6 < l/f_a < 1$$

wherein $f_a$ is the synthesized focal length of said first and second lenses in the main scanning cross section, and l is the distance between said second lens and said surface to be scanned.

39. An optical system according to claim 35, wherein the following condition is satisfied:

$$0 < d_{max}/f_{2b} < 0.15$$

where $f_{2a}$ is the focal length of said second lens and the sub scanning cross section, and $d_{max}$ is the maximum thickness of said second lens in a direction parallel to the optical axis.

40. A laser beam printer comprising:
  a light source unit;
  a light deflector for deflecting a light beam from said light source unit;
  a recording medium; and
  a scanning optical system for guiding the light beam deflected by said light deflector to said recording medium, wherein said scanning optical system comprises a first lens which is made of a plastic material and has a positive power, and a second lens which is disposed close to said first lens at the side thereof closer to said recording medium, is made of a plastic material and has a positive power.

41. An optical system according to claim 40, wherein the following condition is satisfied:

$$0.1 < f_a/f_{2a} < 0.3$$

where $f_{2a}$ is the focal length of said second lens in a main scanning cross section, and $f_a$ is the synthesized focal length of said first and second lenses in the main scanning cross section.

42. An optical system according to claim 40, wherein the following condition is satisfied:

$$0.25 < f_{2b}/f_a < 0.5$$

wherein $f_{2a}$ is the focal length of said second lens in a sub scanning cross section, and $f_a$ is the synthesized focal length of said first and second lenses in the main scanning cross section.

43. An optical system according to claim 40, wherein the following condition is satisfied:

$$0.6 < l/f_a < 1$$

where $f_a$ is the synthesized focal length of said first and second lenses in the main scanning cross section, and l is the distance between said second lens and said recording medium.

44. An optical system according to claim 40, wherein the following condition is satisfied:

$$0 < d_{max}/f_{2b} < 0.15$$

where $f_{2a}$ is the focal length of said second lens in the sub scanning cross section and $d_{max}$ is the maximum thickness of said second lens in a direction parallel to the optical axis.

* * * * *

UNITED STATES PATENT AND TRADEMARK OFFICE
CERTIFICATE OF CORRECTION

PATENT NO. : 5,179,465

DATED : January 12, 1993

INVENTOR(S) : KAZUYUKI KONDO

It is certified that error appears in the above-identified patent and that said Letters Patent is hereby corrected as shown below:

On the title page,
IN THE ABSTRACT:

Column [57], "arrnaged" should read --arranged--.
Column [63], "JAN. 13, 1991" should read --JAN. 31, 1991--.

COLUMN 1

Line 23, "a" should read --an--.
Line 42, "lens, is" should read --lens is--.

COLUMN 2:

Line 34, "toric" should read --toric lens--.

COLUMN 5:

Line 17, "same" should read --the same--.
Line 59, "system," should read --As explained in the foregoing, a scanning optical system,--.

COLUMN 7:

Line 29, "$f_{2a}$" should read --$f_{2b}$--.
Line 30, "subs scanning" should read --sub scanning--.
Line 47, "$f_{2D}$" should read --$f_{2b}$--.

UNITED STATES PATENT AND TRADEMARK OFFICE
CERTIFICATE OF CORRECTION

PATENT NO. : 5,179,465

DATED : January 12, 1993

INVENTOR(S) : KAZUYUKI KONDO

It is certified that error appears in the above-identified patent and that said Letters Patent is hereby corrected as shown below:

COLUMN 8:

Line 11, "toric tens" should read --toric lens--.
Line 40, "claim 71," should read --claim 17,--.
Line 42, "si" should read --is--.
Line 49, "by light deflector" should read --by said light deflector--.
Line 58, "An optical system" should read --A laser beam printer--.
Line 67, "An optical system" should read --A laser beam printer--.

COLUMN 9:

Line 1, "$0.25 < f_{2b}/f_{2a} < 0.5$" should read --$0.25 < f_{2b}/f_a < 0.5$--.
Line 8, "An optical system" should read -- A laser beam printer--.
Line 17, "An optical system" should read --A laser beam printer--.
Line 63, "$f_{2a}$" should read --$f_{2b}$--.

COLUMN 10:

Line 14, "$f_{2a}$" should red --$f_{2b}$--.
Line 43, "$0.25 < f_{2b}/f_a\ 0.5$" should read --$0.25 < f_{2b}/f_a < 0.5$--.

UNITED STATES PATENT AND TRADEMARK OFFICE
CERTIFICATE OF CORRECTION

PATENT NO. : 5,179,465
DATED : January 12, 1993
INVENTOR(S) : KAZUYUKI KONDO It is certified that error appears in the above-identified patent and that said Letters Patent is hereby corrected as shown below:

COLUMN 10:

Line 45, "$f_{2a}$" should read --$f_{2b}$--.
Line 63, "$f_{2a}$" should read --$f_{2b}$--.

Signed and Sealed this

Twenty-eighth Day of December, 1993

Attest:

BRUCE LEHMAN

*Attesting Officer*    Commissioner of Patents and Trademarks